Feb. 17, 1925.
J. W. SMITH
VALVE
Filed Aug. 1, 1921
1,526,385
FIG. II.
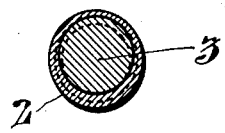
FIG. I.
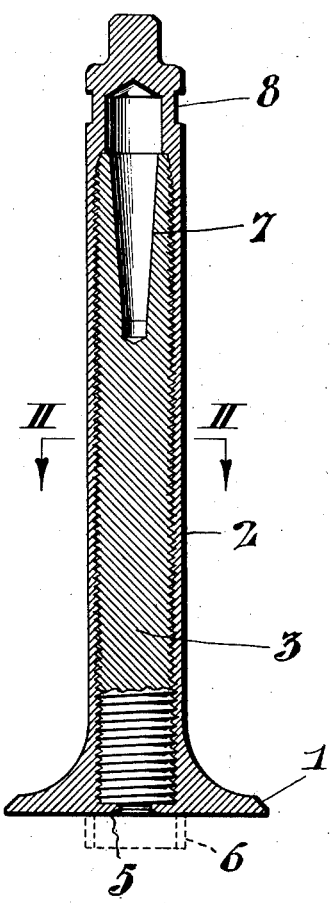
WITNESSES:
John C. Bergner
James H. Bell
INVENTOR:
John W. Smith,
BY
ATTORNEYS.

Patented Feb. 17, 1925.

1,526,385

UNITED STATES PATENT OFFICE.

JOHN W. SMITH, OF PHILADELPHIA, PENNSYLVANIA.

VALVE.

Application filed August 1, 1921. Serial No. 488,831.

*To all whom it may concern:*

Be it known that I, JOHN W. SMITH, a citizen of the United States, residing in Philadelphia, in the county of Philadelphia and State of Pennsylvania, have invented certain new and useful Improvements in Valves, whereof the following is a specification, reference being had to the accompanying drawings.

My invention relates more especially to valves subjected to high temperatures such, for example, as the puppet valves employed in controlling the exhaust of internal combustion motors. Such valves, on account of the extremely high temperatures to which they are subjected, are liable to become warped or expand to such an extent as to cause them to bind in their bearings, and their heads to seat imperfectly with the result that the efficiency of the motors is greatly impaired. In the course of the operation of internal combustion motors, heat imparted to the heads of the exhaust valves when the latter are in closed positions during the explosion of the fuel charges, is readily dissipated by virtue of direct contact of the valves with their seats which are usually air or water cooled. However, when the valves are in open position to permit discharge of the hot exhaust gases, not only are the faces and backs of the heads directly exposed to impingement but considerable portions of their stems as well. It is, therefore, at these critical periods that the greatest amount of heat must be disposed of.

Many attempts have heretofore been made to conduct the excess heat away from the valves in order to prevent distortion. In designing the structures with this end in view, the portions of the valves exposed to the combustion chambers were thought to be the only important surfaces to be taken into consideration. Accordingly, the valves were provided with heat conducting cores of comparatively small diameter (which extended through the valve stems and terminated in large flat ends at the faces of the valve heads) with the idea of isolating the steel portions of the valves and causing the heat to be absorbed directly by the core during the explosive periods of the motors, but the importance of providing for proper transfer of the heat from the steel portions of the valve to the core during the critical periods referred to was entirely ignored. Moreover, the cores of the valves were invariably made of a comparatively heavy metal, usually copper, which, while highly efficient as a heat conductor, was objectionable in that it added materially to the weight of the valves, and hence lowered their efficiency correspondingly.

Among the objects of my invention are to make it possible to dispose of the heat imparted to the valves under all conditions of operation, and more especially at the critical periods aforesaid, in a rapid and efficient manner; and to secure, in valve structures, greater bulk with correspondingly increased conductivity, without rendering their weight prohibitive.

Other objects and attendant advantages of my invention will become readily apparent from the detailed description which follows:

In the drawings, Fig. I is an axial sectional view through a valve structure for internal combustion motors conveniently illustrating my invention; and Fig. II is a cross section of the same viewed in the direction of the arrows II—II in Fig. I.

In practice, the valve herein shown as typical of my invention, is constructed of a suitable wear resistant material, preferably steel, with its head 1 and stem 2 integral. The stem, it will be noted, is of comparatively large diameter, thus affording a large contact surface area conducive to rapid heat transfer. The stem, moreover, is made hollow to provide a cavity or bore extending substantially throughout the length of the stem for the reception of an axial core 3, which may be of any solid material, metallic or other, high in thermal conductivity. For this purpose, I employ either aluminum or an aluminum alloy more especially on account of the extremely low specific gravity of such metals, so that the valve, as a whole, is really as light as, or even lighter in weight with a core of this sort, notwithstanding increased diameter of the stem, than it would be if made solid throughout and proportioned as one of ordinary or common construction. It is to be particularly noted also, that the bore of the stem is made as large as permissible so as to leave but a very thin shell of steel of just sufficient thickness to insure the necessary rigidity in operation.

For the purpose of maintaining efficient and extensive contact between the core 3 and the inner surface of the shell of the stem 2, regardless of unequal expansion of the two dissimilar metals or materials used in the construction of a valve, I prefer to provide the meeting surfaces with comparatively fine, complementary inter-fitting ridges or serrations. In the case of a metallic core, such construction may be obtained simply by resorting to screw threading. When a fusible substance is used, the inner surface of the bore may be screw threaded or serrated in any other manner to afford grooves into which the material may be run when in a molten state. In either of the constructions suggested, any expansion of the two dissimilar materials will obviously tend to effect closer binding of the serrations, thus enhancing the efficiency of the interlocking. In this connection, it may be further stated that aluminum, on account of its comparative softness, will yield readily to temperature changes without danger of distorting the valve stem. It is also to be noted that the core 3 terminates considerably short of the inner end of the receiving cavity or bore of the stem so that ample free space is left for expansion.

In order to protect the end of the core 3 against direct exposure, at the valve face, I prefer to upset the metal about the mouth of the receiving bore or cavity, so that its end is overlapped or serrated as shown at 5 in Fig. I. Sufficient metal for this purpose is afforded in practice by providing the valve head, initially, with a projecting, annular, axial extension such as shown in dotted lines at 6, which, subsequently to the insertion of the core 3, is turned over or displaced in any convenient manner to produce the desired result. By this construction, the core 3 is positively held against displacement within the cavity or bore.

The inner end of the core 3 is axially bored as at 7 to lighten the valve and also to afford an extensive radiating surface which greatly facilitates dissipation of the heat from that portion of the valve stem which protrudes to the exterior of the valve mounting. The outer end of the stem 2 is circumferentially grooved as at 8 for attachment of the means whereby the valve is actuated.

From the foregoing, it will be seen that a valve constructed in accordance with my invention can be made up readily and cheaply manufactured, and on account of the comparatively large bulk of its core is thoroughly efficient in quickly conducting away the excess heat for dissipation to the more massive parts of the motor casing, which are subject to the cooling influence of the outside air or to a suitable circulated cooling medium.

Having thus described my invention, I claim:

1. As an article of manufacture, a valve for internal combustion motors having a hollow stem for receiving a heat conducting core of material high in thermal conductivity, the contacting surfaces of the core and the hollow of the stem being formed with inter-fitting ridges or serrations.

2. As a new article of manufacture, a valve for internal combustion motors having a hollow stem internally threaded and a screw core of material high in thermal conductivity threaded into the stem.

3. An exhaust valve for internal combustion motors having a hollow stem threaded internally and a relatively shorter screw core of aluminum fitted in the stem adapted for rapidly conducting off and dissipating the heat imparted to the valve during the release of the exhaust gases.

4. As an article of manufacture, a valve for internal combustion motors having a hollow stem, a heat conducting core inserted in the stem, the metal of the valve being formed so as to be upset about the mouth of the receiving bore to overlap the end of the core after the latter is in place and to protect the same against direct exposure at the valve face.

5. A valve for internal combustion motors having a head and a stem of hard, wear resistant material and formed with an axial accessible from the head end of the valve, a heat conducting core inserted in said cavity, the metal of the valve head being substantially upset about the mouth of the cavity to overlap the end of the core and to protect the same against direct exposure at the valve face.

6. A valve for internal combustion engines, having a longitudinal bore, a core of heat conducting material filling said bore, and ridges formed on the walls of the bore and on the surface of the core for interfitting relation to insure heat conduction there between and to prevent displacement of the core from the valve.

7. A valve for internal combustion engines, having a longitudinally threaded bore, and a correspondingly threaded core of heat conducting material fitted into the bore in threaded engagement with the walls thereof.

8. A valve for internal combustion motors having an axial cavity, a heat conducting core fitted in said cavity and terminating short of the bottom thereof to allow for longitudinal expansion of the core, the metal of the valve being upset about the mouth of the bore to overlap the end of the core to hold the latter in place.

In testimony whereof, I have hereunto signed my name, at Philadelphia, Pennsylvania, this 19th day of July, 1921.

JOHN W. SMITH.

Witnesses:
JAMES H. BELL,
E. L. FULLERTON.